3,268,980
INSERTED BLADE FACE MILL CUTTER
Richard C. Blakesley, Holcomb, and Lawrence J. Smith, Rochester, N.Y., assignors to The Gleason Works, Rochester, N.Y., a corporation of New York
Filed Oct. 16, 1964, Ser. No. 404,421
8 Claims. (Cl. 29—105)

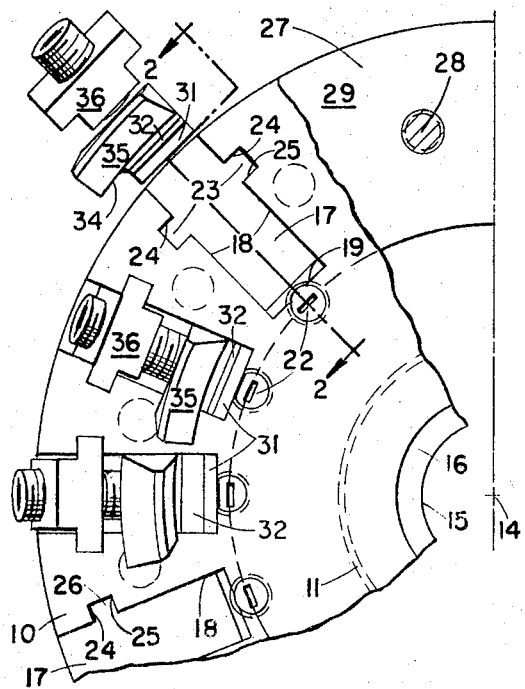
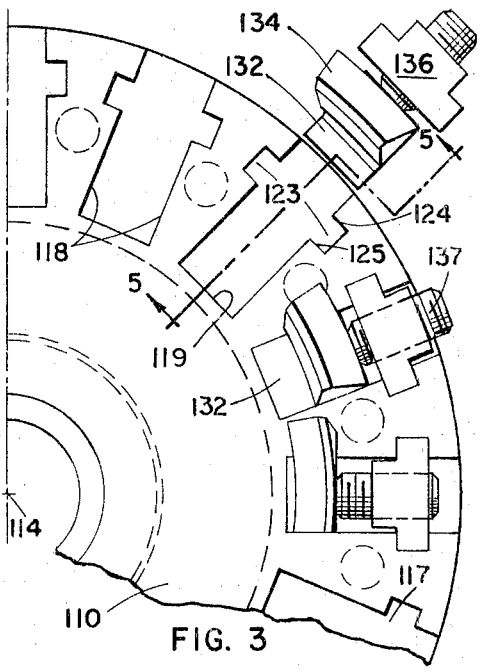
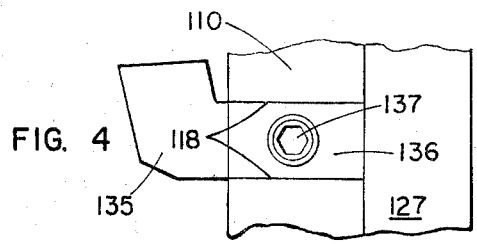
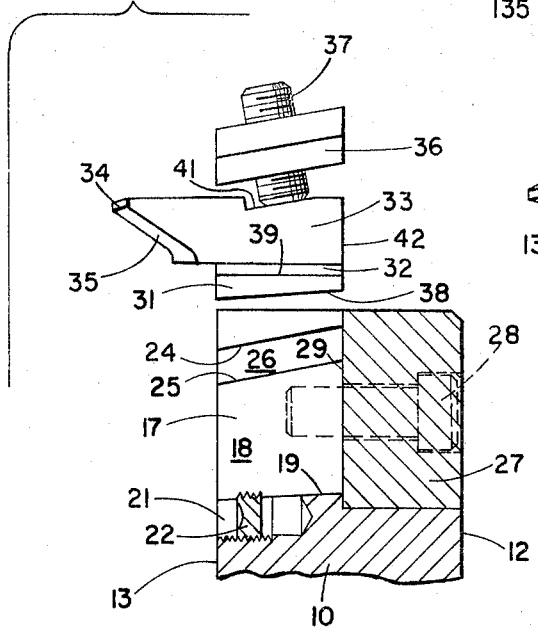
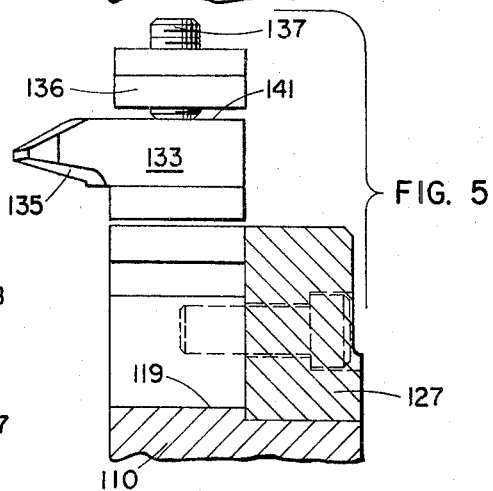
INVENTORS
RICHARD C. BLAKESLEY
LAWRENCE J. SMITH
BY Richard W. Treverton
ATTORNEY

United States Patent Office 3,268,980
Patented August 30, 1966

The present invention relates to an inserted blade face mill cutter for gears and the like, especially for spiral bevel and hypoid gears.

An object of the invention is such a cutter in which the blades are stable in the cutter head under cutting loads and are substantially unaffected by the adjustment of adjacent blades during truing of the cutter, and yet in which the blades do not have, as do the blades of most cutters in use at the present time, shoulders for seating on the front face of the head or screw holes for the blade-fastening screws. The absence of seating shoulders and screw holes reduces the cost of blade manufacture and makes possible narrower blade shanks which in turn increases the number of blades that can be provided around a cutter head of given rigidity. Moreover blades may be replaced after merely loosening the screws, and without removing them.

Cutters with blades of this general kind, which are held in radial slots in a cutter head by radial screws acting in compression, have been known heretofore. However difficulty has been encountered in assembling and truing such cutters by reason of the tightening of the blade-holding screw in one slot disturbing the blades in adjacent slots. An object of the present invention is to obviate or at least to greatly lessen this difficulty in cutters of this type.

A cutter according to the invention comprises a head having substantially radial slots with parallel sides, said sides having lateral recesses whose outer surfaces are substantially perpendicular to said parallel sides, bridge pieces extending across the slots and bearing on said outer surfaces, cutter blades in the slots inward of the bridge pieces, and compression screws threaded to the bridge pieces for clamping the blades in the slots.

With this arrangement, wherein the bridge piece in each slot is a separate part whose surface contact with the cutter head is in a plane substantially at right angles to the direction of the clamping force, tightening or loosening of the screw has been found to have little or no effect of displacing the blades in adjacent slots, and cutter assembly and truing have been accomplished without difficulty.

Preferred embodiments of the invention are shown in the accompanying drawings, wherein:

FIG. 1 is a fragmentary front view of a cutter intended for finishing;

FIG. 2 is an approximately axial section in the planes designated by section line 2—2 in FIG. 1, showing a blade and bridge piece displaced from their slot in the cutter head;

FIG. 3 is a view similar to FIG. 1 but illustrating a cutter intended for roughing;

FIG. 4 is a fragmentary side view of the cutter, at right angles to FIGS. 3 and 5; and, FIG. 5 is a section in the planes indicated by section line 5—5 in FIG. 3.

The finishing cutter shown in FIGS. 1 and 2 comprises a substantially drum shaped cutter head 10 having a tapered central bore 11 extending from its rear face 12 for receiving the tapered nose of the cutter spindle, not shown, of a gear cutting machine. Extending from the front face 13 of the head, and coaxial of bore 11, on axis 14, is a bore 15 for passing the shank of a screw, also not shown, for detachably securing the head to the cutter spindle. A counterbore in the front face provides a shoulder 16 for seating the head of the screw.

Spaced around the periphery of head 10 are a plurality of radially extending blade-receiving slots 17 having parallel side walls 18 disposed in planes that are equally spaced from and parallel to axis 14, and a plane bottom wall 19 perpendicular to side walls 18 and inclined at a small acute angle to axis 14. Opening into the center of each bottom wall is a screw-threaded bore 21, parallel to axis 14, for a wedge adjusting screw 22. A segment of this screw projects into the adjacent slot 17. Lateral recesses 23 extend from the opposite sides of each slot 17, each such recess having parallel plane outer and inner walls, 24 and 25, respectively, perpendicular to side walls 18 and inclined at a small acute angle (10°) to axis 14. Each recess 23 also has a plane bottom wall 26 parallel to side walls 18. The back peripheral portion of the head 10 has therearound an annular recess receiving a ring 27 whose axis is 14. This ring is substantially rectangular in axial section and is rigidly secured to the head by screws 28, there being one such screw threaded into each land between slots 17. The plane front face 29 of the ring constitutes the back wall of each slot 17.

Disposed in each slot 17 of the assembled cutter there is a wedge 31, a shim or parallel 32, the orthogonal shank 33 of a cutter blade 34 whose cutting portion 35 projects from the front of the head 10, and a substantially T-shaped bridge piece 36 through which is threaded a set screw 37. These elements are shown displaced from the uppermost slot 17 in FIG. 1, and also in FIG. 2, for clarity of illustration. The wedge, parallel and blade shank have plane parallel side walls adapted for sliding surface contact with slot side walls 18. The inner and outer plane faces 38 and 39 of the wedge are inclined to each other at the same angle that slot bottom wall 19 is inclined to the cutter axis, so that the outer face of the parallel 32, upon which the blade shank seats, is parallel to that axis. The outer face 41 of the blade shank engageable by the inner end of set screw 37 is parallel to outer recess walls 24 which are in contact with the flanges of the T-shaped bridge piece. Because of the angle (10°) between face 41 and the outer face of the parallel 32, the set screw when tightened not only clamps the blade shank tightly against parallel but also presses the shank backwardly, clamping its plane back face 42 to back wall 29 of the slot. As shown, the set screw is substantially central of the bridge piece and perpendicular to the plane of recess outer walls 24. The flanges of the bridge piece preferably have an easy fit with recess surfaces 24 and 25 (when screw 37 is loosened) and also with recess surfaces 26.

Each wedge has a recess in its inner face for receiving the segment of adjusting screw 22 that projects outwardly from slot bottom wall 19. With this arrangement fine radial adjustments of the blade 34 can be made by loosening set screw 37 and turning the screw 22 to thereby move the wedge along bottom wall 19 of the slot. Coarse radial blade adjustments are made by substituting thicker or thinner parallels 32. To accommodate large radial adjustments of the blade the bridge pieces are inverted. To illustrate, in FIG. 1 the bridge pieces for the first and second slots from the top of the view have their narrow ends innermost, while in the third slot, where the parallel 32 is much thicker, the bridge piece is relatively inverted, so that its narrow end is outermost.

In FIGS. 3-5, which illustrate a cutter intended primarily for roughing, corresponding parts are designated by the numerals as in FIGS. 1 and 2 with the prefix "1." The basic differences of the cutter of FIGS. 3-5 over that of FIGS. 1 and 2 are that it omits the wedges 31 and their adjusting screws 22; that the slot bottom wall 119 and the lateral recesses 123 (whose side faces are designated 124 and 125) are parallel to axis 114; that the outer faces 141 of the blade shanks 133 and the outer and inner faces of the bridge pieces 136 are also parallel to axis 114; and that the set screws 137 are perpendicular to the axis 114. Accordingly the blades are adjustable only by substitution of parallels 132 of different thicknesses (or by omission of them, as in the slot which extends horizontally in FIG. 3); and tightening of screws 137 does not serve to press the blades against backing ring 127, this being done instead by the operator as he tightens the screws.

Having now described preferred embodiments of our invention, what we claim is:

1. A face mill cutter comprising a head having substantially radial slots with parallel sides, said sides having lateral recesses whose outer surfaces are substantially perpendicular to said parallel sides, bridge pieces extending across the slots and bearing on said outer surfaces, cutter blades in the slots inward of the bridge pieces, and compression screws threaded to the bridge pieces for clamping the blades in the slots.

2. A cutter according to claim 1 in which the screws are substantially parallel to said parallel sides of the slots.

3. A cutter according to claim 2 in which the screws are substantially radial of the cutter.

4. A cutter according to claim 2 in which the head and blades have abutting surfaces to limit backward axial displacement of the blades, the inner surfaces of the blades are substantially parallel to the cutter axis, and the outer surfaces of the blades engaged by the screws and said outer surfaces of said lateral recesses incline outwardly from front to back.

5. A cutter according to claim 4 in which said screws are substantially perpendicular to said outer surfaces of the blades.

6. A cutter according to claim 1 in which wedges are interposed between the bottoms of the radial slots and the inner surfaces of the blades for adjusting the blades radially.

7. A cutter according to claim 1 in which the bridge pieces are invertible in the slots and are of substantially T-shape so that the surfaces thereof engaged with said outer faces of the lateral recesses are differently spaced from the inner faces thereof in the two positions of inversion.

8. A face mill cutter comprising a head having approximately radial slots with opposed lateral recesses in the sides thereof, bridge pieces extending across the slots and engaged in said recesses, cutter blades in the slots inward of the bridge pieces, and compression screws threaded to the bridge pieces for clamping the blades in the slots, the bridge pieces and lateral recesses having compression bearing contact in planes which are at least approximately perpendicular to the axes of the related compression screws.

References Cited by the Examiner

UNITED STATES PATENTS

| 1,319,458 | 10/1919 | Brenner | 29—105 |
| 2,033,384 | 3/1936 | Marshall | 29—105 |
| 2,264,299 | 12/1941 | Crosby | 29—105 |
| 2,669,149 | 2/1954 | Watson | 29—105 X |

FOREIGN PATENTS

| 678,209 | 8/1952 | Great Britain. |
| 742,385 | 12/1955 | Great Britain. |

WILLIAM W. DYER, Jr., *Primary Examiner.*

H. L. HINSON, *Assistant Examiner.*